(12) United States Patent
Nath et al.

(10) Patent No.: US 8,593,277 B2
(45) Date of Patent: Nov. 26, 2013

(54) SYSTEM AND METHOD FOR PROXIMITY DETECTION

(75) Inventors: Ujjual Nath, Manhattan Beach, CA (US); Gaurav Sharma, Irvine, CA (US); William Fletcher, Westlake Village, CA (US); Douglas MacGlashan, Redondo Beach, CA (US); Brian Billett, Los Angeles, CA (US)

(73) Assignee: Kaarya, LLC., Torrance, CA (US)

( * ) Notice: Subject to any disclaimer, the term of this patent is extended or adjusted under 35 U.S.C. 154(b) by 0 days.

(21) Appl. No.: 13/424,264

(22) Filed: Mar. 19, 2012

(65) Prior Publication Data

US 2012/0235865 A1    Sep. 20, 2012

Related U.S. Application Data

(60) Provisional application No. 61/453,943, filed on Mar. 17, 2011.

(51) Int. Cl.
G08B 1/08        (2006.01)

(52) U.S. Cl.
USPC .............. 340/539.13; 379/201.01; 455/414.1; 455/567; 705/7.12

(58) Field of Classification Search
USPC ............... 340/539.16; 455/457, 414.1, 456.1, 455/404.2
See application file for complete search history.

(56) References Cited

U.S. PATENT DOCUMENTS

| | | | |
|---|---|---|---|
| 6,218,961 B1 | 4/2001 | Gross et al. | |
| 6,529,164 B1 | 3/2003 | Carter | |
| 7,385,529 B2 | 6/2008 | Hersch et al. | |
| 7,780,522 B2 | 8/2010 | Lutnick | |
| 8,018,329 B2 | 9/2011 | Morgan et al. | |
| 8,090,532 B2 | 1/2012 | Tashev et al. | |
| 8,243,897 B2* | 8/2012 | Groth | 379/201.01 |
| 8,347,317 B1* | 1/2013 | Balaji et al. | 719/318 |
| 2005/0250552 A1 | 11/2005 | Eagle et al. | 455/567 |
| 2007/0027806 A1* | 2/2007 | Sands et al. | 705/42 |
| 2010/0332430 A1 | 12/2010 | Caraviello et al. | |
| 2011/0029370 A1* | 2/2011 | Roeding et al. | 705/14.38 |
| 2012/0224743 A1 | 9/2012 | Rodriguez et al. | |
| 2012/0250539 A1 | 10/2012 | Lin et al. | |
| 2012/0317306 A1 | 12/2012 | Radinsky et al. | |

OTHER PUBLICATIONS

Eagle, Nathan and Pentland, Alex. "Social Serendipity: Mobilizing Social Software." Pervasive Computing, IEEE CS. Apr.-Jun. 2005. pp. 28-34.*

(Continued)

*Primary Examiner* — Brian Zimmerman
*Assistant Examiner* — Thomas McCormack
(74) *Attorney, Agent, or Firm* — Brian Billett

(57) ABSTRACT

The present invention is for a system and method for determining the proximity of a mobile device to a location without the use of a satellite based or other location awareness system, nor a stationary beacon of any kind. Instead, the mobile device monitors radio frequency broadcast identification codes from nearby mobile devices, and determines if the set of detected identification codes is sufficiently similar to a weighted set of identification codes attributed to specified location. If the calculation of similarity meets the confidence conditions of the system, notification is made that the customer or visitor has arrived. The invention utilizes a combination of confidence interval computation, machine learning, and fault tolerance mechanisms to optimize the success of correctly detecting that the device is near the relevant location.

19 Claims, 5 Drawing Sheets

(56) References Cited

OTHER PUBLICATIONS

Jin Yin, Qiang Yang, Lionel M. Ni, Learning Adaptive Temporal Radio Maps for Signal-Strength-Based Location Estimation, IEEE Transactions on Mobile Computing, vol. 7 No. 7, Jul. 2008, pp. 869-882.

Kaveh Pahlavan, Xinrong Li, Juha-Pekka Makela, Indoor Geolocation Science and Technology, IEEE Communications Magazine, Feb. 2002, pp. 112-118.

Azadeh Kushki, Konstantinos Plataniotis, Anastasios Venetsanopoulos, Kernel-Based Positioning in Wireless Local Are Networks, IEEE Transactions on Mobile Computing, vol. 6 No. 6, Jun. 2007, pp. 689-705.

Jeffrey Junfeng Pan, Sinno Jialin Pan, Jie Yin, Lionel M. Ni, Qiang Yang, Tracking Mobile Users in Wireless Networks via Semi-supervised Colocalization, IEEE Transactions on Pattern Analysis and Machine Intelligence, vol. 34 No. 3, Mar. 2012, pp. 587-600.

William H. Press, Saul A. Teukolsky, William T. Vetterling, Brian P. Flannery, Classification and Inference (Chapter 16), from Numerical Recipes—The Art of Scientific Computing, 2007, pp. 840-898.

Nathan Eagle, Alex Pentland, Social Serendipity: Mobilizing Social Software, Pervasive computing, IEEE CS, Apr.-Jun. 2005, pp. 28-34.

Linsky Joel, Bluetooth Simple Pairing Whitepaper, Aug. 3, 2006.

\* cited by examiner

SYSTEM AND METHOD FOR PROXIMITY DETECTION

This application for patent claims priority from provisional patent application 61/453,943.

FIELD OF THE INVENTION

The present invention generally relates to the field of navigation, specifically the determination of the proximity of a mobile device to a location.

BACKGROUND OF THE INVENTION

Navigation is a fundamental objective of transportation and as old a problem as the evolution of animals from plants. Biological systems evolved a number of very clever methods for navigation, roughly categorized as allothetic or idiothetic navigation. Allothetic navigation is defined as the use of external cues from the environment for determining location. Idiothetic navigation is defined as the use of internal systems for navigation and orientation, such as the inner ear vestibular canals in humans used for balance. Analogous systems in machines for allothetic systems are GPS navigation, and gyroscopic orientation for idiothetic navigation.

The wide availability and commonplace implementation of satellite based navigation systems, such as GPS, since the 1990's, has overshadowed alternative navigation systems and aids. Satellite based systems are perceived to be a panacea for all navigation and orientation problems. In practice, however, since navigation often involves not simply location information, but relevance and context, a single method for navigation is not optimal for every problem. In machines, as in nature, systems most appropriate to individual problems are significantly more efficient and effective than one-size-fits-all approaches.

Satellite based systems have a number of inherent shortcomings, the most problematic among these is dependence on clear lines of sight to multiple satellites. Any disruption in a clear line of sight causes immediate failure. Any time a user is indoors, in a garage, or in an urban "canyon" between tall buildings, the system falters or fails. Satellite systems require significant power consumption in order to function at optimal performance.

The present problem of determining the arrival of a particular customer at a relevant location has been addressed as a strictly geo-location navigational problem, or as a strictly proximity detection problem. Solutions that address this problem as a geo-location navigation problem typically prefer to utilize a satellite based location aware sensor system, such as GPS, COMPASS, Galileo, or GLONSS. A mobile system must continuously monitor the current satellite based position against a comprehensive catalog of relevant geographic features. A typical implementation for such a system is identified in U.S. Pat. No. 7,385,529 Hersch et. al. concerning the detection of a package delivery.

Another implementation of a geo-location/navigation based system is described in U.S. Pat. No. 6,218,916 Gross et. al., which concerns the detection (and prevention) of train locomotive collisions by determining the real-time location of the locomotives. These exemplar satellite/GPS systems work well for the specific context they are used in, but suffer from the same shortcomings as all such systems for other proximity/navigation applications. Among such problems is the maintenance or otherwise real-time access to a complex database with accurate information regarding latitude/longitude perimeters of all relevant locations.

An extension of satellite based navigation to common proximity detection problems is the geo-fencing solution, in which proximity to a location is defined by a perimeter surrounding a geographic location as latitude/longitude geometry, as in U.S. Pat. No. 7,780,522 by Lutnick, which concerns the determination of taxes on commerce made within geo-fenced areas.

All satellite based proximity/navigation solutions, including such geo-fencing solutions fail for all sheltered or indoor customer-arrival problems, such as arrival of a customer at a particular store in a mall or a particular office, such as a medical office, within a larger facility, such as a shopping mall or office complex.

A commonly proposed solution to the customer-arrival application of the proximity/navigation problem which overcomes the limitations of satellite based solutions is the use of a location beacon system. U.S. Pat. No. 6,529,164 Carter, describes a beacon based approach for tracking personnel or objects within a building utilizing the personnel proximity to radio frequency beacons within the facility. Although the most widely adopted type of solution, these systems require the installation, service, and maintenance of specialized and perhaps proprietary hardware at one or more locations in or around a facility, and are impossible to modify or adjust without changing the facility installed beacon hardware.

No solutions have been proposed for the customer-arrival problem which do not rely upon a satellite based system, nor provide an adaptable and context sensitive system which utilizes only existing facility and customer devices.

SUMMARY OF THE INVENTION

In accordance with the present invention, the problem of detecting the arrival of a customer, visitor, or object at a specified location or facility and announcing the arrival, is solved by monitoring radio frequency broadcast identification codes from nearby mobile devices, and determining if the set of detected identification codes is sufficiently similar to a weighted set of identification codes attributed to a specified location. If the calculation of similarity meets the confidence conditions of the system, notification is made that the customer or visitor has arrived. Expected arrival times, such as appointment schedules are utilized as supplemental information for confidence computation. An option for the customer or visitor to announce arrival provides fault-tolerance. The system adapts to changes in the facility characteristics over time by adjusting and improving the accuracy of the confidence computation.

It is an object of the present invention to detect the proximity of a mobile device to a specified location by the detection and analysis of identification codes from mobile devices associated with the location only.

It is an object of the present invention to utilize the detection of one or more nearby Bluetooth Media Access Control (MAC) addresses from mobile devices associated with a specified location for determining proximity to the location.

It is an object of the present invention to utilize a confidence computation derived from a weighted set of detected identification codes to determine whether such detection indicates arrival at the specified location.

It is an object of the present invention to initiate such detection process only after the proximity of the mobile device to the user's vehicle is determined by detecting an identification code broadcast from a manufacturer or aftermarket device installed on the vehicle.

It is an object of the present invention to utilize information regarding user scheduled appointments at the specified location to improve the accuracy of the confidence computation.

It is an object of the present invention to utilize a calibration or learning adjustment process to improve the confidence computation by adjustment of parameters of the computation.

It is an object of the present invention to utilize an optional capability of the user to announce arrival at the specified location with a software initiated communication from the user's mobile device.

It is an object of the present invention to operate as a customer arrival notification system for vehicle service facilities.

It is an object of the present invention to operate as a customer arrival notification system for retail establishments.

It is an object of the present invention to operate as a patient arrival notification system for health care facilities.

It is an object of the present invention to communicate the identification of the user who has arrived at the specified location for the purpose of entering such identification into a customer service queue.

DETAILED DESCRIPTION OF THE INVENTION

In the preferred embodiment of the present invention, a vehicle service facility desires to improve efficiency and customer service by notifying service assistants at the facility when customers have arrived at the facility. Customers may or may not have service appointments in advance of their arrival. Customers or users of the service facility have an application available on their mobile phone to optionally send a manual notification of arrival: "I am here".

Service advisers, service assistants, and supervisors at the vehicle service facility each carry mobile devices registered with the decision system. Such mobile devices may be smartphones, tablets, or both. Such devices may have an application available and installed on them as a client application which receives the arrival event notification from decision system of the present invention.

Figure 1:
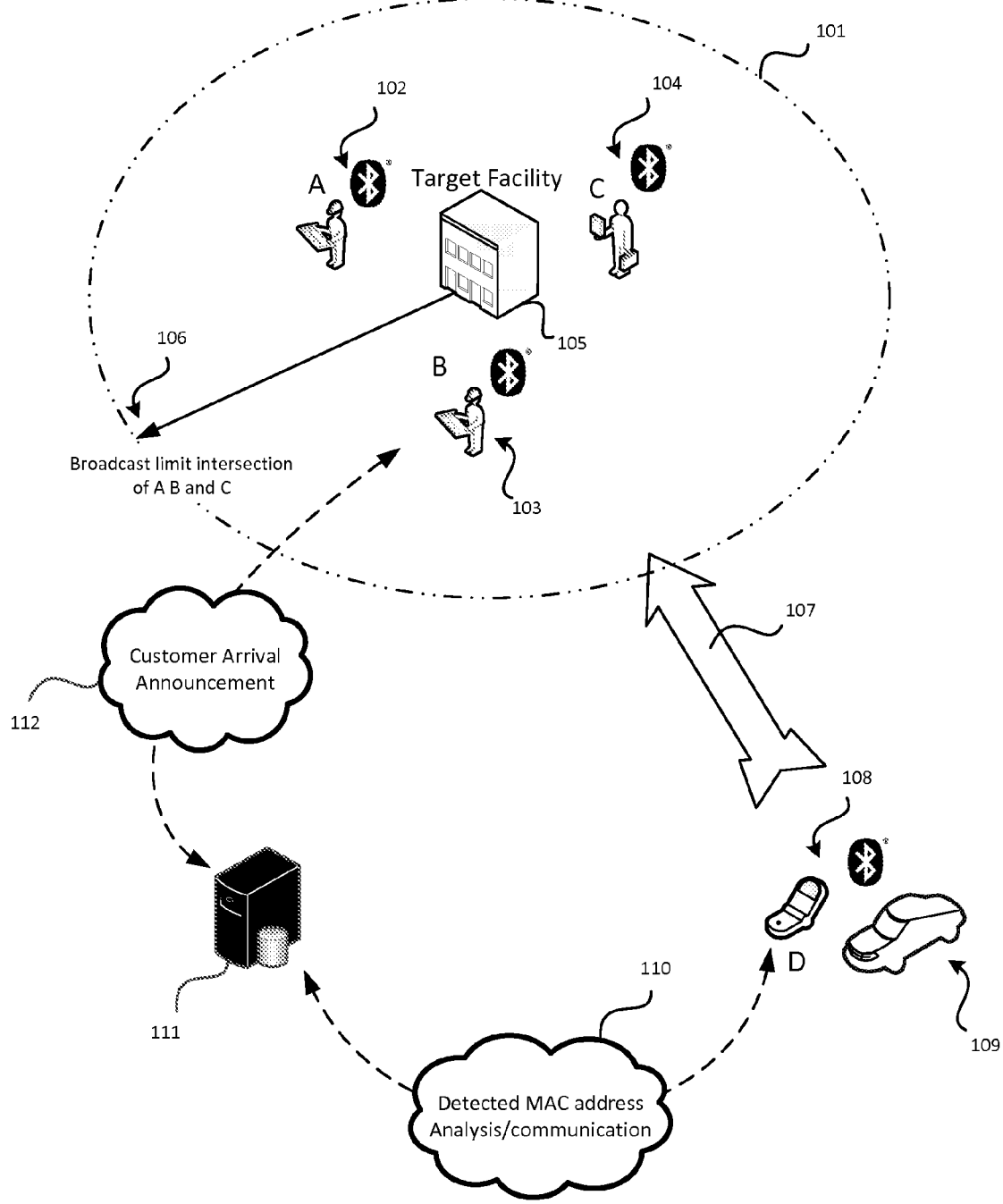
FIG. 1 depicts a typical environment for the customer-arrival invention embodiment application for a customer arriving by vehicle at a service facility. In the drawing, three service advisors and a customer vehicle are represented, along with communication to the system data hub. The Bluetooth short range wireless communication protocol and Media Access Control (MAC) address are chosen in this embodiment as the signal carrier and identification code.

FIG. 1 depicts an example configuration of the preferred embodiment context of the invention. In FIG. 1, the customer (mobile phone) 108 is approaching 107 the vehicle repair facility 105 in his vehicle 109. Three service advisors or other people associated with the facility are depicted A 102, B, 103, and C 104. The customer 108, vehicle 109, and service advisors 102, 103, and 104, all have Bluetooth enabled cell phones on their person. Each Bluetooth component of these devices has a unique Media Access Control (MAC) address identification code. All MAC addresses of devices associated with the facility 105 are registered with the data hub 111.

In the embodiment shown in FIG. 1, each Bluetooth device has a maximum range capability. The overlap or intersection of the ranges of the shown devices 102, 103, and 104 is depicted by the range perimeter 101. When the customer enters the perimeter where all three devices are detected simultaneously, or within a defined interval timespan, the device communicates 110 this set of MAC address codes to the data hub 111. The data hub then performs a confidence calculation against its database of known MAC addresses to assess the likelihood that a customer has arrived for service. If the set meets such criteria, the arrival notification is communicated 112 to the relevant service advisors at the facility.

Figure 1A:
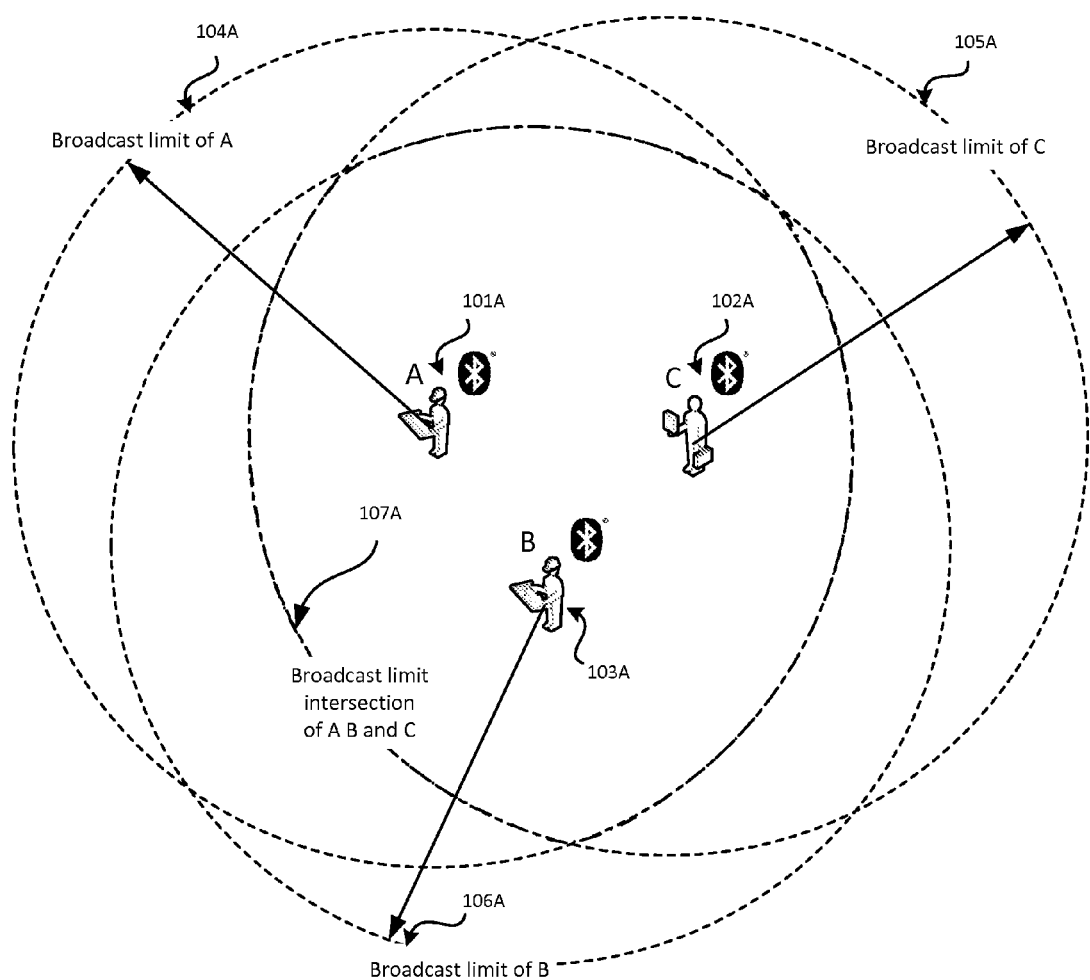
FIG. 1A is a detail from FIG. 1 depicting the physical region overlap or intersection in which the identification of all three mobile phones/users would be detectable for a customer or visitor entering such a region.

FIG. 1A is a detailed illustration of the range overlap perimeter 101 from FIG. 1. In this detail, each service advisor 101A, 102A, and 103A is shown with their respective device broadcast range limits 104A, 105A, and 106A. The overlap region where the broadcasts of all three devices can be detected is depicted by the perimeter 107A of heavy dashed lines corresponding to 101 from FIG. 1.

Figure 2:
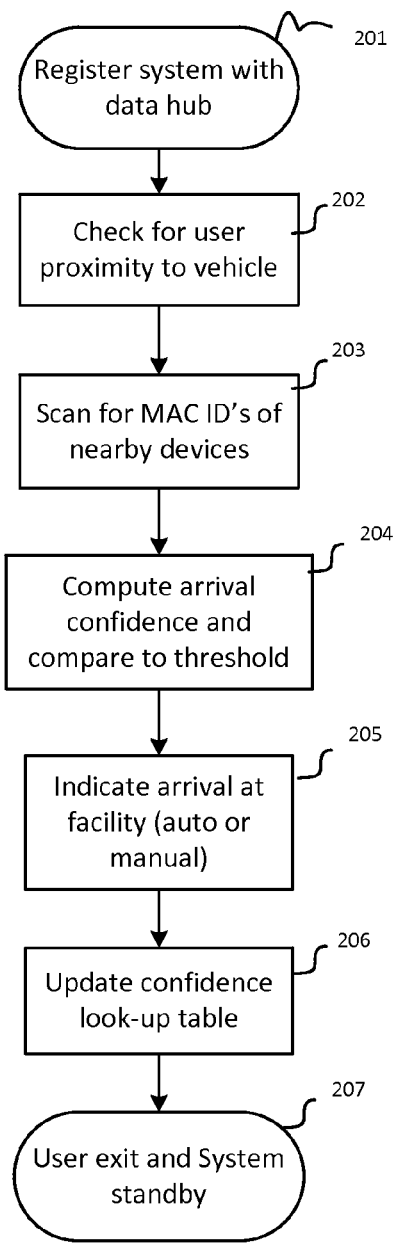
FIG. 2 is a flowchart illustrating an overview of the process for the preferred embodiment of the invention.

FIG. 2 is a flowchart illustrating the overall system process. First, all users must register with the data hub 201 to begin operating the arrival announcement system on their mobile device. Once registered and running, the system periodically checks for proximity of the user's vehicle by scanning for the registered vehicle Bluetooth or other wireless communication MAC address or identification code 202. If vehicle proximity is detected, the device begins to scan for nearby Bluetooth MAC address codes 203. Detected codes are periodically sent to the data hub for comparison to known MAC address codes for service advisors and other MAC addresses associated with one or more service facilities 204. This comparison is the confidence computation discussed in more detail below. If the computation exceeds a confidence threshold or is within the confidence interval boundary, arrival at the identified facility is indicated by sending an announcement to the appropriate service advisor for the facility, and a confirmation is sent to the user 205. If a user notices that no announcement has been sent, the ability to manually notify the service advisor is available by the "I am here" application on the user's mobile device 205. False positive and false negatives are communicated to the data hub so that the confidence calculation may be adjusted or calibrated 206. When the user departs from the vehicle and thus terminates proximity to the vehicle, the scan and detect process terminates 207.

Figure 3:
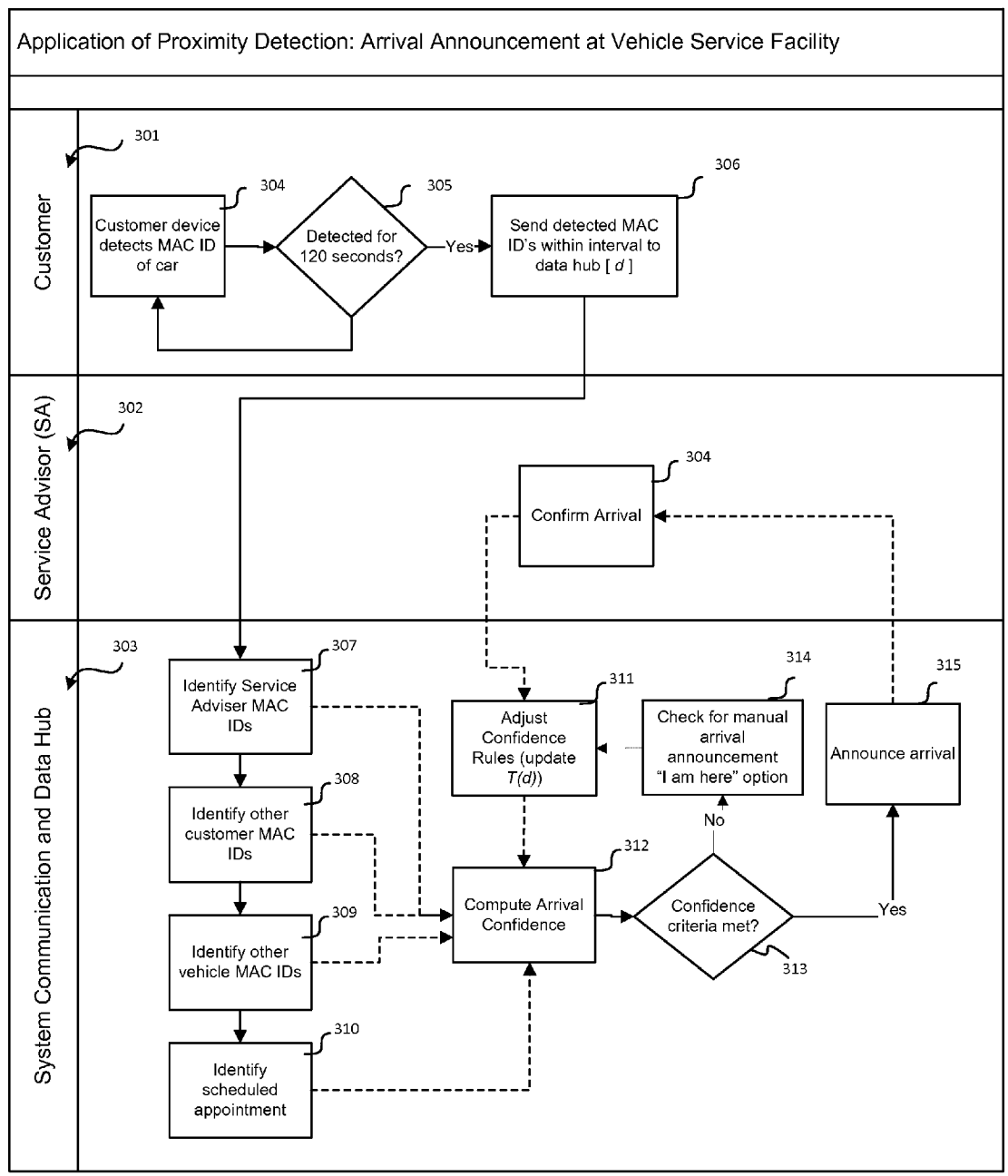
FIG. 3 is a swim lane flowchart illustrating the detailed process and data flow separated by the portions of the process implemented by the various components of the system including the customer (mobile phone/device), service advisor (mobile phone/device), and the data hub (Internet based secure data server).

FIG. 3 is a detailed diagram and flow chart illustrating how the process of arrival detection is divided as swim lanes between the customer's mobile device 301, the service advisor's mobile device 302, and the system data hub 303. After the initialization of the application on the user's mobile device, the device begins to monitor for the user's vehicle Bluetooth MAC ID 304. Multiple users with multiple vehicles may be registered. If this user-vehicle proximity continues for minimum period shown as 120 seconds 305, the mobile device begins to scan and periodically communicate the detected Bluetooth MAC ID's to the system data hub. MAC ID's sent to the system hub are grouped according to a the codes detected during a limited time interval 306. Depending on the registered identity and vehicle identity communicated to the data hub of the for the user, the data hub compares the detected Bluetooth MAC ID set to one or more of the following, service advisor MAC ID's 307, other registered customer MAC ID's associated with a given facility 308, and other vehicle MAC ID's associated with the facility 309. A vector or tensor of the detected MAC ID values is compared against an exemplar vector or tensor corresponding to the weighted associated set of MAC ID's for the facility. Among available methods for computing the confidence of similarity, the vector dot product is used to compute the angle between the vectors, a generalized representation of the similarity 312. If the computer confidence level (in this embodiment the angle between the vectors), is within the defined interval or exceeds a confidence threshold 313, an arrival is indicated and an announcement is sent to the relevant service advisor identifying both the system user and the vehicle (the identity for each having been sent by the user to the data hub) 315.

After announcement of arrival has been sent to the service advisor 315, the service advisor confirms the arrival or non-arrival of the announced user and vehicle 304. As detailed further below, the confidence rules are adjusted or vector component weights adjusted by the indication of true positives, false positives, and false negatives 312.

Figure 4:
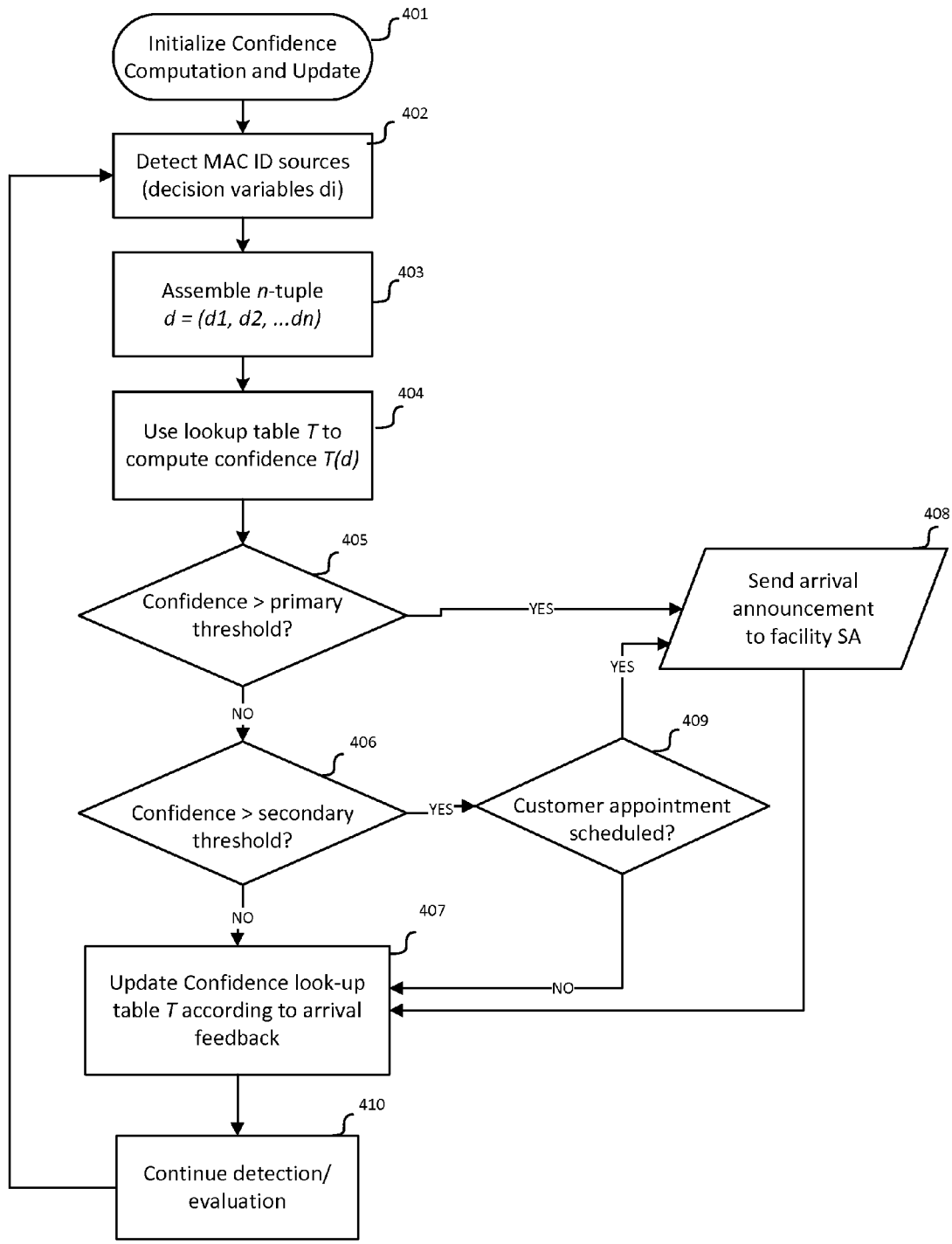
FIG. 4 is a flow chart detail for the arrival confidence computation.

FIG. 4 is a detail flowchart corresponding to the confidence computation process. Confidence computation is initiated and performed by the system data hub for each set of MAC ID's sent to it by participating system users 401. The confidence computation begins with the assembly of the detected MAC ID's available from one or more sources 402. For identified MAC ID's, the vector component weight is assigned according to system rules 403 and a vector corresponding to the available identified set is formed 404 for comparison by dot product calculation to the most appropriate facility exemplar vector 405. The computed dot product is then tested against a threshold for arrival confidence or tested against a high confidence boundary or interval 406. If this criteria is met, announcement of a user and vehicle arrival is sent to a service advisor 407.

If the high confidence interval is not met 406, the computed confidence measurement is compared against a secondary expanded boundary or lower threshold 408. If the secondary confidence level is met, the system checks for a service appointment scheduled by the user at the service facility indicated. If the user is scheduled for a service appointment at or within a limited time frame of the current MAC ID set analyzed 409, announcement of user arrival is sent to the designated service advisor for the facility 407. If the system indicated that the user has arrived at the incorrect facility, an optional embodiment and configuration of the system notifies both the user and the designated facility as well as the facility service advisor with the scheduled appointment are notified of the error for coordination of any needed actions. If no level of confidence is reached that the user has arrived at any facility, the system continues to scan MAC ID's and operate provided the user stays in proximity to his vehicle 410.

If a confirmed arrival occurs or an adverse condition occurs, the system reviews its computation makes proportionate adjustments to its confidence threshold or input vector/tensor component weighting. If the system detects one of three events: confirmation of an accurate arrival, a manually sent arrival by a user while the system was operational, or a negative confirmation of user arrival following an automated arrival announcement, the confidence rule calibration process is initiated. If the indicated event is an accurate arrival confirmation by a service advisor, the event is considered a true positive, and the weights of vector components for present MAC ID's currently detected by the user which resulted in an accurate announcement are increased. If the system receives a counter-confirmation by a service advisor indicating that an arrival announcement was incorrect, the system considers the event a false positive and adjusts the vector component weights corresponding to the input MAC ID's and dynamically adjusts the confidence threshold. If the system receives a manual arrival notification by a users while the system was operating for that user, the system considers such an event a false negative, and adjusts the vector component weights corresponding to the input MAC ID's and dynamically adjusts the confidence threshold. Once the calibration is computed, the results are logged and system vector component weights are updated at the data hub. Following the system update or no indication of an adverse event, the system returns to its normal detection cycle.

The implications of the present invention's numerous potential configurations and embodiments are far reaching. Although the preferred embodiment described here is for the application of the system to the arrival of a customer at a repair facility for vehicles, the effective utility of the system for outdoor and indoor (and indoor/outdoor combination) versions of this system differentiate it from currently available alternative solutions. Such embodiments include arrival of a bank customer, a frequent retail customer, a patient at a health care facility, or an employee reporting for off-site work.

Although the invention has been described in terms of the preferred embodiments, one skilled in the art will recognize many embodiments not mentioned here by the discussion and drawing of the invention. Interpretation should not be limited to those embodiments specifically described in this specification.

We claim:

1. A system for detecting a user's mobile device in proximity to a location comprising:
 a plurality of known mobile devices capable of a wireless short range data communication protocol;
 each of said detected known mobile devices having a unique associated digital identity value;
 each of said detected known mobile devices being associated with a one or more known locations;
 said detected known mobile devices are capable of being, and may or may not be, located at associated locations while the system is operating;
 at least one user mobile device capable of a wireless short range data communication protocol;
 said user mobile device capable of detecting said any of said known devices including each device's unique associated digital identity value;
 said user mobile device capable of long distance wireless data communication;
 a central server computer capable of data communication with said user mobile device;
 said central server computer hosting a data processing system which accepts as input sets of said detected known device identity values from said user mobile device;
 said central computer hosting a database of values corresponding to selected locations and
 associated said detected known mobile device identities;
 said central server computer hosting a data processing program which computes the probability of said user device proximity to said selected location by processing the input sets of detected known mobile device identities by an algorithm which utilizes said database;

said central server program capable of notifying selected devices of user device proximity to said location;

whereby the detection by said system of sets of one or more detected known mobile devices, whose combined proximity to each other exceeds a threshold value for probability, indicates probable proximity to the desired location.

2. A system as in claim 1 further comprising:
said detected known mobile device identities are the media access control (MAC) addresses associated with the wireless communication interfaces of said detected devices.

3. A system as in claim 2 further comprising:
said wireless communication interface for said detected devices is the BLUETOOTH® wireless data communication protocol.

4. A system as in claim 2 further comprising:
said wireless communication interface for said detected devices is for one of the Wi-Fi communication protocols defined by one of the IEEE 802.11 standards.

5. A system as in claim 1 further comprising:
said central server computer probability computation utilizing a numerical weight associated with each of the said detected known mobile device identities;
said numerical weight value modified and updated by said proximity detection data processing program.

6. A system as in claim 1 further comprising:
said user device operates to detect said known devices only when the said user device is detected to be in proximity to a vehicle associated with said user.

7. A system as in claim 1 further comprising:
said central server computer probability computation, utilizing information regarding dates and times of expected proximity of the user device and said location.

8. A system as in claim 1 further comprising:
said central server computer probability computation, utilizing information communicated by said user device regarding user initiated notification of proximity to said location.

9. A system as in claim 1 further comprising:
said system is operated wherein said notification and user device identity is communicated for the purpose of entering such identification of a customer arrival into a customer service queue.

10. A system as in claim 1 further comprising:
said system does not include a satellite based location aware sensor.

11. A system as in claim 1 further comprising:
said system does not include a fixed beacon based proximity detection device,
and said system does not require any additional fixed devices at said location.

12. A method for detecting the proximity of a mobile device to a location comprising;
compiling identification information for a plurality of detected known mobile devices associated with one or more selected locations, said detected known mobile devices may or may not be located at the associated locations while the system is operating;
detecting said known mobile devices by one or more user mobile devices;
communicating said detected known mobile device identification information from said user mobile device to a central server computer by a wireless data transmission;
computing the proximity probability of said user device to said location by a data processing program on said central server computer;
comparing said proximity probability to an arrival confidence threshold value;
notifying selected recipients of said user device proximity to said location if said proximity probability exceeds said arrival confidence threshold;
and updating selected parameters related to proximity probability calculation.

13. A method as in claim 12 further comprising;
said proximity probability computation utilizing a numerical weight associated with each of the detected known device identities;
said numerical weight value modified and updated by said proximity detection data processing program.

14. A method as in claim 12 further comprising:
said user device operates to detect said known devices only when the said user device is detected to be in proximity to a vehicle associated with said user.

15. A method as in claim 12 further comprising:
said central server computer probability computation utilizing information regarding dates and times of expected proximity of the user device and said location.

16. A method as in claim 12 further comprising:
said central server computer probability computation utilizing information communicated by said user device regarding user initiated notification of proximity to said location.

17. A method as in claim 12 further comprising:
said method operating wherein said proximity notification and user device identity is communicated for the purpose of entering such identification of a customer arrival into a customer service queue.

18. A method as in claim 12 further comprising:
said method does not use a satellite based location aware sensor.

19. A method as in claim 12 further comprising:
said method does not use a fixed beacon based proximity detection device,
and said method does not require any additional fixed devices at said location.

* * * * *